(12) United States Patent
Fattal

(10) Patent No.: US 11,733,556 B2
(45) Date of Patent: Aug. 22, 2023

(54) PRIVACY-MODE BACKLIGHT, PRIVACY DISPLAY, AND METHOD

(71) Applicant: LEIA INC., Menlo Park, CA (US)

(72) Inventor: David A. Fattal, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/718,123

(22) Filed: Apr. 11, 2022

(65) Prior Publication Data

US 2022/0236596 A1 Jul. 28, 2022

Related U.S. Application Data

(63) Continuation of application No. PCT/US2019/056402, filed on Oct. 15, 2019.

(51) Int. Cl.
*G02F 1/13* (2006.01)
*G02F 1/1335* (2006.01)
*G02B 27/30* (2006.01)

(52) U.S. Cl.
CPC ...... *G02F 1/1323* (2013.01); *G02F 1/133504* (2013.01); *G02F 1/133524* (2013.01); *G02B 27/30* (2013.01)

(58) Field of Classification Search
CPC ............. G02F 1/1323; G02F 1/133504; G02F 1/133524; G02F 1/133626; G02B 27/30;

(Continued)

(56) References Cited

U.S. PATENT DOCUMENTS 1,116,939 A 11/1914 Shifley
9,128,226 B2 9/2015 Fattal et al.
(Continued)

FOREIGN PATENT DOCUMENTS

CN 209433052 U 9/2019
JP 2007272065 A 10/2007
(Continued)

OTHER PUBLICATIONS

International Search Report and Written Opinion (ISRWO) from the International Searching Authority (ISA/KR) dated Jul. 10, 2020 (11 pages) for counterpart parent PCT Application No. PCT/US2019/056402.

(Continued)

*Primary Examiner* — Donald L Raleigh
(74) *Attorney, Agent, or Firm* — J. Michael Johnson

(57) ABSTRACT

A privacy-mode backlight includes a light guide configured to guide light having a predetermined collimation factor orthogonal to a length of the light guide and a plurality of scattering line elements arranged along the light guide length. Scattering line elements of the scattering line element plurality are configured to scatter out through an emission surface of the light guide a portion of the guided light as emitted light having an illumination beamwidth in the orthogonal direction determined by the collimation factor. The privacy-mode backlight further includes a directional optical diffuser configured to provide directional diffusion of the emitted light in a direction corresponding to the light guide length. The directional diffusion may provide uniform illumination in the light guide length direction. A privacy display further includes an array of light valves configured to modulate the emitted light to provide a private image.

20 Claims, 7 Drawing Sheets

(58) Field of Classification Search
CPC ............ G02B 2207/123; G02B 5/1819; G02B 6/0038
See application file for complete search history.

(56) References Cited

U.S. PATENT DOCUMENTS

| | | | |
|---|---|---|---|
| 9,201,270 B2 | 12/2015 | Fattal et al. | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 10,462,453 B2 | 10/2019 | Koerber et al. | |
| 10,551,546 B2 | 2/2020 | Fattal | |
| 10,649,128 B2 | 5/2020 | Fattal et al. | |
| 10,705,281 B2 | 7/2020 | Fattal et al. | |
| 10,798,371 B2 | 10/2020 | Fattal | |
| 10,802,212 B2 | 10/2020 | Fattal | |
| 10,802,443 B2 | 10/2020 | Fattal | |
| 10,810,917 B2 | 10/2020 | Fattal | |
| 10,830,939 B2 | 11/2020 | Fattal et al. | |
| 10,838,134 B2 | 11/2020 | Fattal et al. | |
| 10,852,560 B2 | 12/2020 | Fattal | |
| 10,884,175 B2 | 1/2021 | Fattal | |
| 10,928,564 B2 | 2/2021 | Fattal | |
| 10,928,677 B2 | 2/2021 | Aieta et al. | |
| 10,969,627 B2 | 4/2021 | Fattal et al. | |
| 10,989,962 B2 | 4/2021 | Ma et al. | |
| 11,004,407 B2 | 5/2021 | Fattal et al. | |
| 11,016,235 B2 | 5/2021 | Fattal et al. | |
| 11,041,988 B2 | 6/2021 | Fattal et al. | |
| 11,048,036 B2 | 6/2021 | Ma et al. | |
| 11,143,810 B2 | 10/2021 | Fattal et al. | |
| 11,200,855 B2 | 12/2021 | Fattal | |
| 11,307,344 B2 | 4/2022 | Fattal et al. | |
| 2003/0174492 A1* | 9/2003 | Ohkawa | G02B 6/0068 362/339 |
| 2009/0310064 A1 | 12/2009 | Choe et al. | |
| 2009/0322986 A1 | 12/2009 | Wei et al. | |
| 2012/0200807 A1 | 8/2012 | Wei et al. | |
| 2013/0169518 A1 | 7/2013 | Wu et al. | |
| 2015/0049388 A1 | 2/2015 | Tsuji | |
| 2017/0363794 A1 | 12/2017 | Wan et al. | |
| 2019/0018186 A1 | 1/2019 | Fattal | |
| 2020/0005718 A1 | 1/2020 | Fattal | |
| 2020/0033526 A1 | 1/2020 | Fattal et al. | |
| 2020/0301165 A1 | 9/2020 | Fattal | |
| 2020/0310135 A1 | 10/2020 | Fattal | |
| 2021/0157050 A1 | 5/2021 | Fattal | |
| 2021/0157160 A1 | 5/2021 | Li et al. | |
| 2021/0294017 A1 | 9/2021 | Fattal | |
| 2021/0390914 A1 | 12/2021 | Fattal | |
| 2021/0407438 A1 | 12/2021 | Fattal | |
| 2022/0044644 A1 | 2/2022 | Fattal | |

FOREIGN PATENT DOCUMENTS

| | | | |
|---|---|---|---|
| KR | 20090130760 A | 12/2009 | |
| WO | 2012038856 A1 | 3/2012 | |
| WO | WO-2017131807 A1 * | 8/2017 | ......... G02B 27/4205 |
| WO | WO-2018182991 A1 * | 10/2018 | ........... G02B 6/0018 |
| WO | 2021021238 A1 | 2/2021 | |
| WO | 2021040700 A1 | 3/2021 | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.
Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.
Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.
Travis et al., "Collimated light from a waveguide for a display backlight," Optics Express, Oct. 2009, pp. 19714-19719, vol. 17, No. 22.
Xu et al., "Computer-Generated Holography for Dynamic Display of 3D Objects with Full Parallax," International Journal of Virtual Reality, 2009, pp. 33-38, vol. 8, No. 2.
Son, Jung-Young et al., "Three-Dimensional Imaging Methods Based on Multiview Images," IEEE/OSA Journal of Display Technology, Sep. 2005, pp. 125-140, vol. 1, No. 1.

* cited by examiner

ABSTRACT# PRIVACY-MODE BACKLIGHT, PRIVACY DISPLAY, AND METHOD

CROSS-REFERENCE TO RELATED APPLICATIONS

This application is a continuation patent application of and claims priority to International Patent Application No. PCT/US2019/056402, filed Oct. 15, 2019, the contents of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various other displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
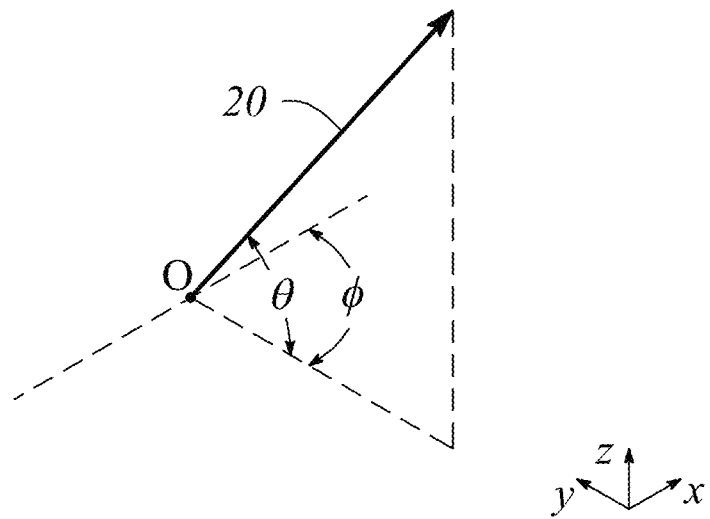
FIG. 1 illustrates a graphical representation of angular components of a directional light beam having a particular principal angular direction in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a privacy-mode backlight. The privacy-mode backlight includes a light guide that guides light as guided light along a length of the light guide, where the guided light has a predetermined collimation factor. Moreover, the privacy-mode backlight includes a plurality of scattering line elements arranged parallel to and spaced apart from one another along the light guide length. Each of the scattering line elements is configured to scatter out through an emission surface of the light guide a portion of the guided light as emitted light, and the emitted light has an illumination beamwidth in in a direction orthogonal to the light guide length determined by the collimation factor. Furthermore, the privacy-mode backlight includes a directional optical diffuser configured to provide directional diffusion of the emitted light in a direction corresponding to the light guide length. The directional optical diffuser may be configured to provide a uniform illumination pattern of the emitted light in the direction corresponding to the light guide length. For example, a diffusion angle of the directional optical diffuser may be configured to spread out the emitted light from each of the scattering line elements to have an illumination extent at an output plane of the privacy-mode backlight that is equivalent to a distance (e.g., a center-to-center spacing) between adjacent scattering line elements of the scattering line element plurality. Consequently, the imaged scattering line elements may collectively appear to completely fill the length of the light guide with spaces between the imaged scattering line elements.

In some embodiments, the privacy-mode backlight is included in a display such as a privacy display configured to provide a private image to a user, where the private image is exclusively visible within an illumination beamwidth along a privacy axis of the privacy-mode backlight (along the length of the light guide). In other embodiments, the privacy-mode backlight may be part of a mode-switchable display that is configured to provide the private image during a privacy mode of the mode-switchable display and a shared image during a public mode of the mode-switchable display. In particular, the mode-switchable display may include a broad-angle backlight configured to provide broad-angle light during a shared mode, where the broad-angle light has a broad-angle illumination beamwidth enabling the user to view the shared image over a much wider angular range than that of the private image. Thus, the mode-switchable display may be configured to selectively display the private image during the private mode and the shared image during the share mode.

Herein, a light beam having a direction is referred to as a 'directional light beam' and may have a principal angular direction given by angular components {θ, φ}, by definition herein. The angular component θ is referred to herein as the 'elevation component' or 'elevation angle' of the directional light beam. The angular component φ is referred to as the 'azimuth component' or 'azimuth angle' of the directional light beam. By definition, the elevation angle θ is an angle in a vertical plane (e.g., perpendicular to a plane of the display screen while the azimuth angle φ is an angle in a horizontal plane (e.g., parallel to the display screen plane). FIG. 1 illustrates a graphical representation of the angular components {θ, φ} of a directional light beam 20 having a particular principal angular direction in an example, according to an embodiment consistent with the principles described herein. In addition, the light beam 20 is emitted or emanates from a particular point, by definition herein. That is, by definition, the directional light beam 20 has a central ray associated with a particular point of origin O, as illustrated.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is broadly defined as a plurality of features (i.e., diffractive features) arranged to provide diffraction of light incident on the diffraction grating. In some examples, the plurality of features may be arranged in a periodic manner or a quasi-periodic manner. In other examples, the diffraction grating may be a mixed-period diffraction grating that includes a plurality of diffraction gratings, each diffraction grating of the plurality having a different periodic arrangement of features. In some examples, the diffraction grating may be substantially periodic in a first direction or dimension and substantially aperiodic (e.g., constant, random, etc.) in another direction across or along the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be below a top surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a plurality of diffraction gratings, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin \theta_i - \frac{m\lambda}{d}\right) \quad (1)$$

where λ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer (i.e., m=±1, ±2, ... ). A diffraction angle $\theta_m$ of a light beam produced by the diffraction grating may be given by equation (1). First-order diffraction or more specifically a first-order diffraction angle $\theta_m$ is provided when the diffraction order m is equal to one (i.e., m=1).

Figure 2:
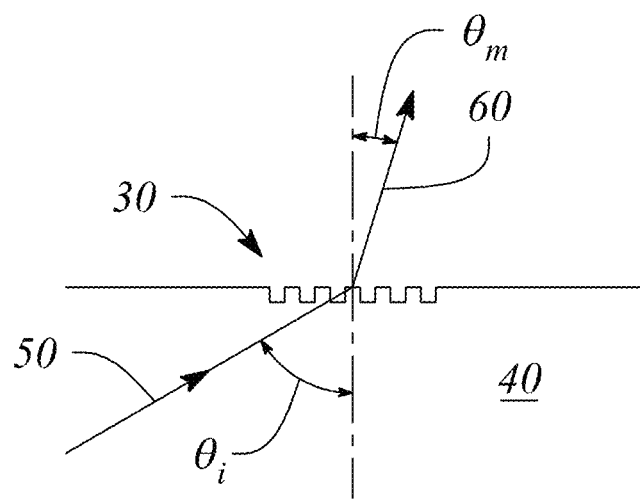
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and coupled-out or scattered-out by the diffraction grating 30 as a result of diffraction of the incident light beam 50. The directional light beam 60 has a diffraction angle $\theta_m$ (or 'principal angular direction' herein) as given by equation (1). The directional light beam 60 may correspond to a diffraction order 'm' of the diffraction grating 30, for example.

Further, the diffractive features may be curved and may also have a predetermined orientation (e.g., a slant or a rotation) relative to a propagation direction of light, according to some embodiments. One or both of the curve of the diffractive features and the orientation of the diffractive features may be configured to control a direction of light coupled-out by the diffraction grating, for example. For example, a principal angular direction of the directional light may be a function of an angle of the diffractive feature at a point at which the light is incident on the diffraction grating relative to a propagation direction of the incident light.

While a plurality of diffraction gratings is used as an illustrative example in the discussion that follows, in some embodiments other components may be used, such as at least one of a micro-reflective element and a micro-refractive element. For example, the micro-reflective element may include a triangular-shaped mirror, a trapezoid-shaped mirror, a pyramid-shaped mirror, a rectangular-shaped mirror, a hemispherical-shaped mirror, a concave mirror and/or a convex mirror. In some embodiments, a micro-refractive element may include a triangular-shaped refractive element, a trapezoid-shaped refractive element, a pyramid-shaped refractive element, a rectangular-shaped refractive element, a hemispherical-shaped refractive element, a concave refractive element and/or a convex refractive element.

According to various embodiments, one or both of a principle angular direction and an angular spread of the directional light beam 60 exiting a diffraction grating 30 may be determined by a characteristic of the diffraction grating 30 including, but not limited to, a size (e.g., one or more of length, width, area, and etc.) of the diffractive grating 30 along with a 'grating pitch' or a diffractive feature spacing and an orientation of a diffraction grating. In some embodiments, the diffractive grating 30 or more generally a scattering element may be considered an 'extended point light source', i.e., a plurality of point light sources distributed across an extent of the diffraction grating 30 or scattering element, by definition herein. Further, a directional light beam produced by the diffraction grating or a scattering element has a principal angular direction given by angular components {θ, ϕ}, by definition herein, and as described above with respect to FIG. 1.

Herein a 'collimator' is defined as substantially any optical device or apparatus that is configured to collimate light. For example, a collimator may include, but is not limited to, a collimating mirror or reflector, a collimating diffraction grating, a collimating lens, or various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or related characteristic in one or both of two orthogonal directions that provides light collimation, according to some embodiments.

Herein, a 'collimation factor,' denoted σ, is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein, the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, an 'angle-preserving scattering feature' or equivalently an 'angle-preserving scattering element' is any feature, element, or scatterer configured to scatter light in a manner that substantially preserves in scattered light an angular spread of light incident on the feature, element, or scatterer. In particular, by definition, an angular spread $\sigma_s$ of light scattered by an angle-preserving scattering feature is a function of an angular spread σ of the incident light (i.e., $\sigma_s=f(\sigma)$). In some embodiments, the angular spread $\sigma_s$ of the scattered light is a linear function of the angular spread or collimation factor σ of the incident light (e.g., $\sigma_s=a\cdot\sigma$, where a is a positive scale factor). That is, the angular spread $\sigma_s$ of light scattered by an angle-preserving scattering feature may be substantially proportional to the angular spread or collimation factor σ of the incident light. For example, the angular spread $\sigma_s$ of the scattered light may be substantially equal to the incident light angular spread σ (e.g., $\sigma_s \approx \sigma$). A uniform diffraction grating (i.e., a diffraction grating having a substantially uniform or constant diffractive feature spacing or grating pitch) is an example of an angle-preserving scattering feature.

By definition, 'broad-angle' emitted light is defined as light having a cone angle that is greater than a cone angle of emitted light used to provide a private image or in privacy display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than about fifty degrees (e.g., >±50°). For example, the cone angle of the broad-angle emitted light may be greater than about sixty degrees (e.g., >±60°).

In some embodiments, the broad-angle emitted light cone angle may be defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'an element' means one or more elements and as such, 'the element' means 'the element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
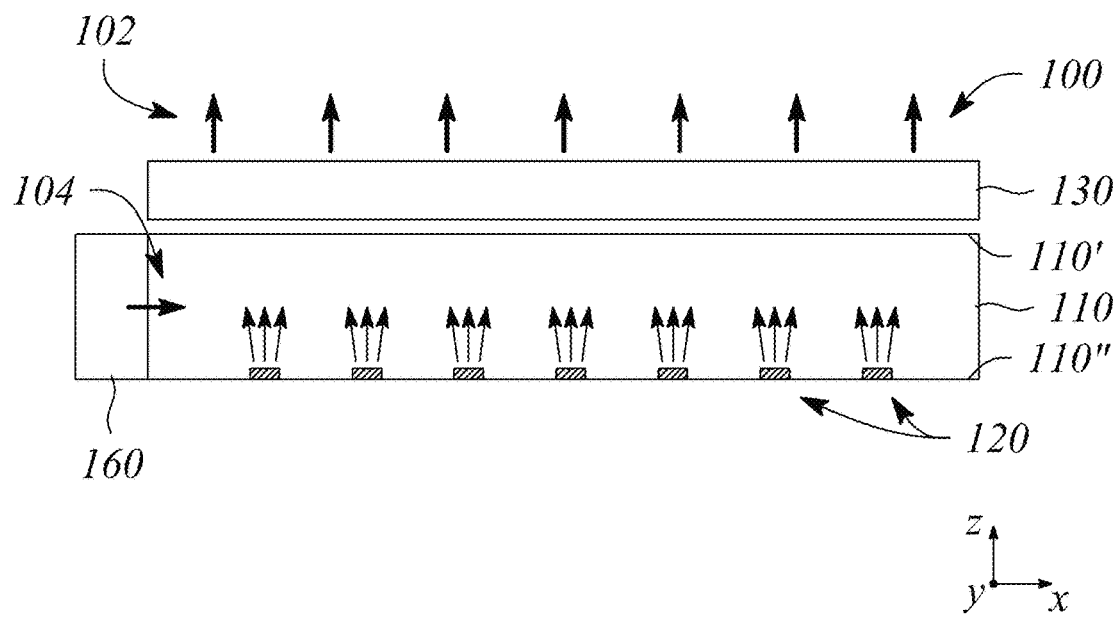
FIG. 3A illustrates a cross-sectional view of a privacy-mode backlight in an example, according to an embodiment consistent with the principles described herein.
Figure 3B:
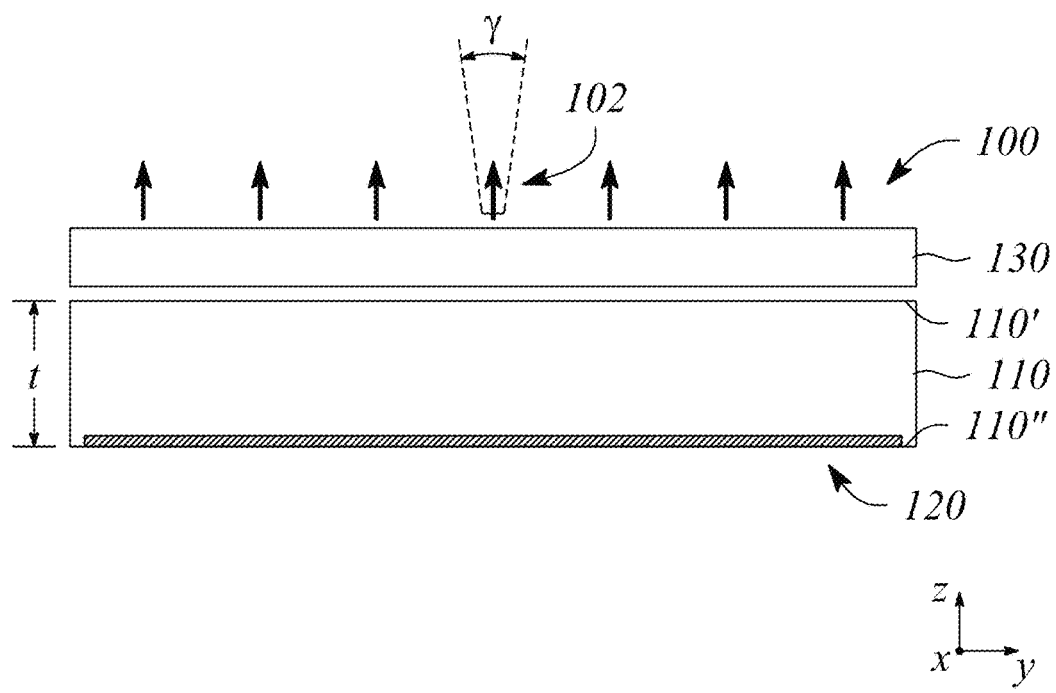
FIG. 3B illustrates another cross-sectional view of a privacy-mode backlight in an example, according to an embodiment consistent with the principles described herein.
Figure 3C:
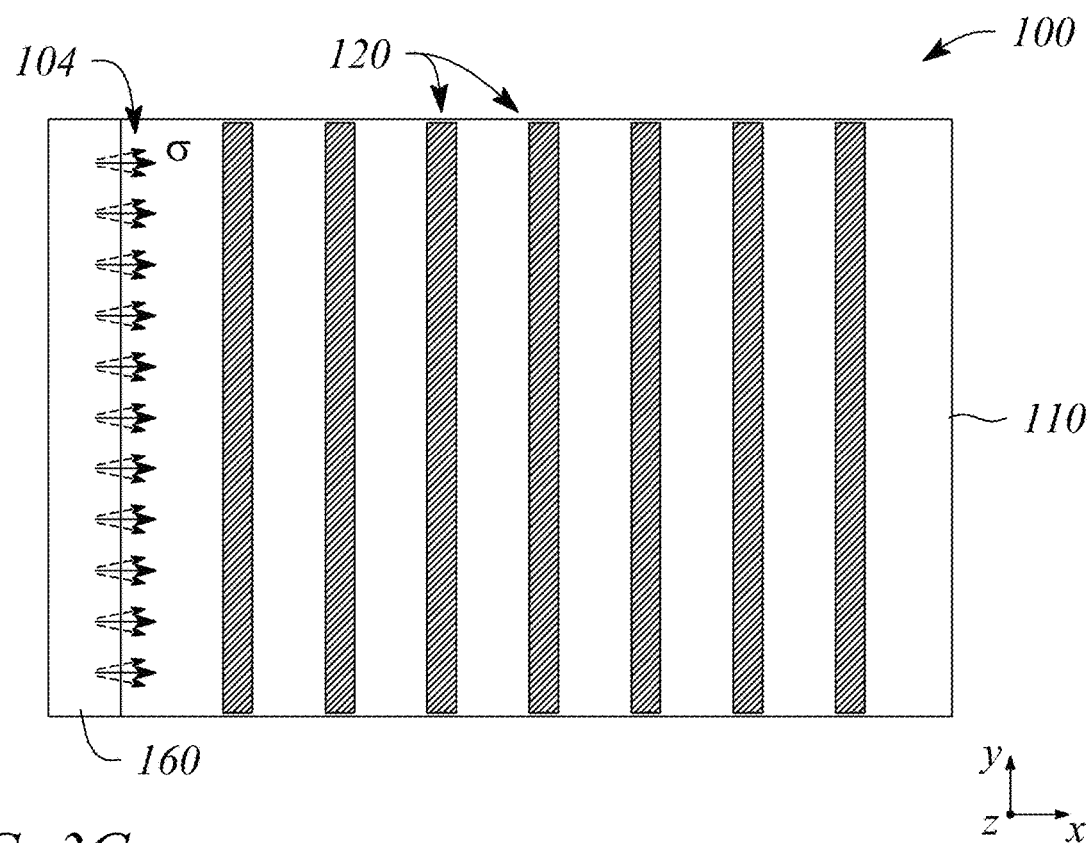
FIG. 3C illustrates a top view of a privacy-mode backlight in an example, according to an embodiment consistent with the principles described herein.

According to some embodiments of the principles described herein, a privacy-mode backlight is provided. FIG. 3A illustrates a cross-sectional view of a privacy-mode backlight 100 in an example, according to an embodiment consistent with the principles described herein. FIG. 3B illustrates another cross-sectional view of a privacy-mode backlight 100 in an example, according to an embodiment consistent with the principles described herein. FIG. 3C illustrates a top view of the privacy-mode backlight 100 in an example, according to an embodiment consistent with the principles described herein. In various embodiments, the privacy-mode backlight 100 is configured to emit light as emitted light 102 having a predetermined illumination beamwidth.

As illustrated, the privacy-mode backlight 100 comprises a light guide 110. The light guide 110 is configured to guide light along a length of the light guide 110 as guided light 104 (i.e., a guided light beam 104). For example, the light guide 110 may include a material (such as a dielectric material) configured to function as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In particular, the light guide 110 may be a slab or plate optical waveguide (i.e., a plate light guide) comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

According to various embodiments, the light guide 110 is configured to guide the guided light 104 according to total internal reflection at a non-zero propagation angle between a first surface 110' (e.g., 'front' or 'top' surface or side) and a second surface 110" (e.g., 'back' surface or side) of the light guide 110. In particular, the guided light 104 propagates by reflecting or 'bouncing' between the first surface 110' and the second surface 110" of the light guide 110 at the non-zero propagation angle. In some embodiments, a plurality of guided light beams comprising different colors of light may be guided by the light guide 110 as the guided light 104 at respective ones of different color-specific, non-zero propagation angles.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten degrees (10°) and about fifty degrees (50°) or, in some examples, between about twenty degrees (20°) and about forty degrees (40°), or between about twenty-five degrees (25°) and about thirty-five degrees (35°). For example, the non-zero propagation angle may be about thirty degrees (30°). In other examples, the non-zero propagation angle may be about 20°, or about 25°, or about 35°. Moreover, a specific non-zero propagation angle may be chosen (e.g., arbitrarily) for a particular implementation as long as the specific non-zero propagation angle is chosen to be less than the critical angle of total internal reflection within the light guide 110.

Further, the guided light 104, or equivalently the guided light beam 104, provided by coupling light into the light guide 110 may be a collimated light beam, according to various embodiments. Herein, a 'collimated light' or a 'collimated light beam' is generally defined as a beam of light in which rays of the light beam are substantially parallel to one another within the light beam (e.g., the guided light beam 104). Also, by definition herein, rays of light that diverge or are scattered from the collimated light beam are not considered to be part of the collimated light beam. In some embodiments (not illustrated) a collimator, such as a lens, diffraction grating, reflector or mirror, as described above, may be included to collimate the light, e.g., from a light source. In other embodiments, the light source itself may comprise a collimator. The collimated light provided to and guided by the light guide 110 as the guided light 104 may be a collimated guided light beam. In particular, the guided light 104 may be collimated according to or having a collimation factor σ, in various embodiments. In some embodiments, the guided light 104 has predetermined collimation factor in a width direction that is orthogonal to the light guide length. As illustrated, the width direction of the privacy-mode backlight 100 corresponds to a y-direction and the light guide length or length direction corresponds to an x-direction.

The privacy-mode backlight 100 illustrated in FIGS. 3A-3C further comprises a plurality of scattering line elements 120. According to various embodiments, individual scattering line elements 120 of the scattering line element plurality are arranged parallel to and spaced apart from one another along the length direction (i.e., x-direction) of the light guide 110. In particular, the scattering line elements 120 of the plurality are separated from one another by a finite (i.e., non-zero) inter-element distance or space and represent individual, distinct elements along the light guide length (i.e., x-direction, as illustrated), by definition herein. Further, the scattering line elements 120 of the plurality generally do not intersect, overlap or otherwise touch one another, according to various embodiments. As such, each scattering line element 120 of the scattering line element plurality is generally distinct and separated from other ones of the scattering line elements 120, at least in the length or x-direction.

According to various embodiments, each of scattering line elements 120 of the scattering line element plurality is configured to scatter out through an emission surface of the light guide 110 (e.g., such as the first surface 110') a portion of the guided light 104 as the emitted light 102. Further, the scattering line elements 120 are configured to provide the emitted light 102 having an illumination beamwidth γ in the direction orthogonal length direction that is determined by the collimation factor σ of the guided light 104, according to various embodiments. In FIG. 3B, the illumination beamwidth γ in the orthogonal direction (or width direction) is depicted as being an angle in plane parallel to the y-direction. In some embodiments, the scattering line elements 120 may be substantially unidirectional scattering elements configured preferentially scatter out the guided light 104 in a direction of or toward an emission surface of the light guide 110. For example, preferential scattering toward the emission surface is illustrated in FIG. 3A by arrows point toward the first surface 110' of the light guide 110 by way of example and not limitation. Further, the scattering line elements 120 may be angle-preserving scatterers, where the illumination beamwidth γ of the emitted light 102 in the orthogonal or width direction is a linear function of the collimation factor σ of the guided light 104 (e.g., γ=k·σ, where k is a constant scale factor).

According to various embodiments, the privacy-mode backlight 100 further comprises a directional optical diffuser 130. The directional optical diffuser is configured to provide directional diffusion of the emitted light in a direction corresponding to the light guide length. In particular, the directional optical diffuser may have a diffuser axis along the length direction of the light guide 110, i.e., x-direction as illustrated. The directional optical diffuser 130 having the diffuser axis oriented along the length direction is configured to provide directional diffusion of the emitted light 102 in a direction corresponding to the light guide length, i.e., the x-direction, as illustrated. In various embodiments, the directional diffusion of the emitted light 102 provided by the directional optical diffuser 130 may be configured to effectively expand the apparent size of scattering line elements 120 to provide a uniform or substantially uniform illumination pattern of the emitted light 102 in the direction corresponding to the light guide length. Further, the directional optical diffuser 130 may provide substantially little or no diffusion in the width direction or y-direction, in some embodiments. For example, the directional optical diffuser 130 may be a one-dimensional (1D) optical diffuser. As such, the directional optical diffuser 130 is configured to substantially preserve the illumination beamwidth of the emitted light 102 in the orthogonal direction (i.e., width or y-direction) in order to ensure viewing privacy of the privacy-mode backlight 100, while simultaneously providing uniform illumination in or along the length direction.

For example, the emitted light 102 may have the illumination beamwidth γ in the orthogonal or y-direction direction, while illumination by the emitted light 102 in the x-direction is comprises a substantially uniform illumination pattern. The uniform illumination pattern may facilitate high resolution of a display that employs the privacy-mode backlight 100 since each pixel or light valve of the display may be illuminated in a substantially uniform manner.

In some embodiments, a diffusion angle of the directional optical diffuser 130 is configured to effectively spread out the emitted light 102 from each of the plurality of scattering line elements 120 to have an illumination extent at an output plane of the privacy-mode backlight 100 that is equivalent to a distance between adjacent scattering line elements 120 of the scattering line element plurality. For example, the extent of the image of the scattering line elements 120 provided by the diffusion angle of the directional optical diffuser 130 may be equal to or greater than a pitch of the adjacent scattering line elements 120. Stated differently, the diffusion angle of the directional optical diffuser may be chosen such that an image of a scattering line element 120 has an extent at the output plane that makes the plurality of scattering line elements 120 appear to be a uniform, continuous scattering element in the x-direction. As such, an effective light source provided by the privacy-mode backlight 100 along the x-direction may appear to be uniform over the length of the light guide 110 (i.e., along the x-direction). In some embodiments, the effective light source may equal to a product of the diffusion angle of the directional optical diffuser 130 and a thickness t of the light guide 110, divided by an index of refraction of the light guide 110.

For example, a size of the effective light source LS in the image of the scattering line element 120 may be given in terms of the thickness t by equation (2) as $$LS = \frac{\delta n_x \cdot t}{n} \quad (2)$$

where $\delta n_x$ is the diffusion angle of the directional optical diffuser 130 and n is an index of refraction of the light guide 110. In some embodiments, the effective light source size may be equal to or even greater than a pitch or spacing between the scattering line elements 120 to insure uniform illumination in the length direction.

Figure 4:
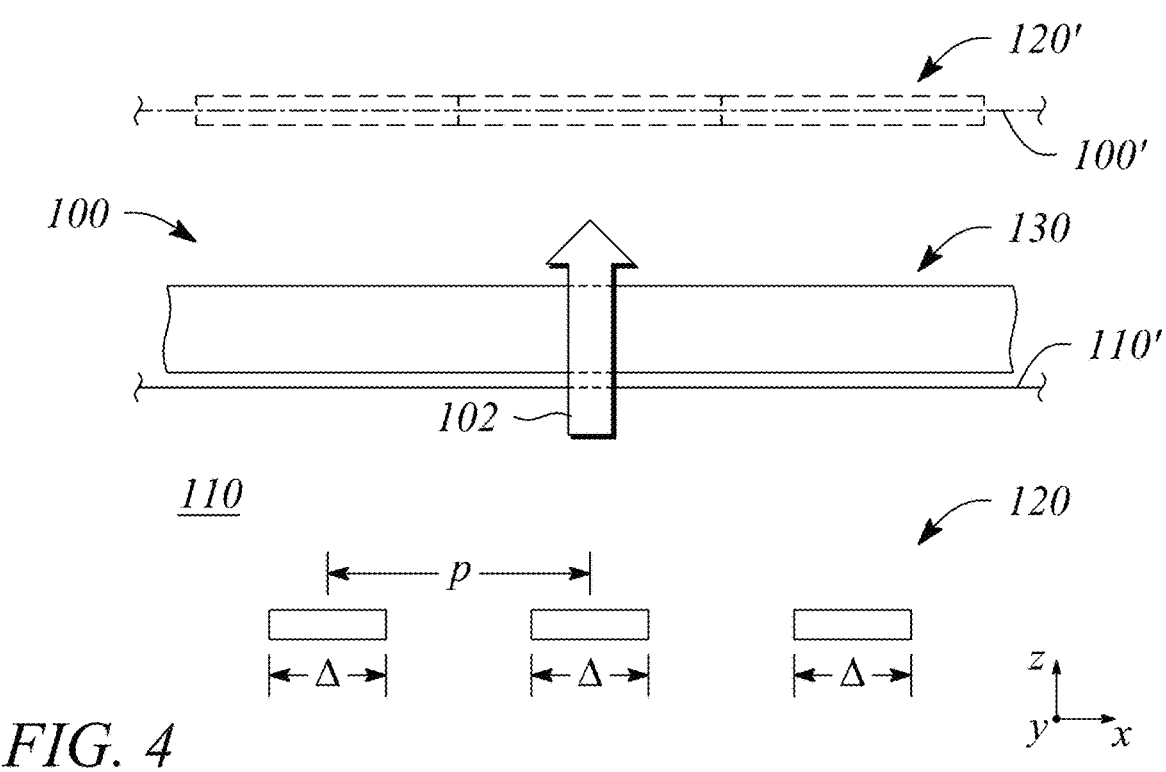
FIG. 4 illustrates a side view of an effect of a directional optical diffuser on an image of a scattering line element in an example, according to an embodiment of the principles described herein.

FIG. 4 illustrates a side view of an effect of a directional optical diffuser 130 on an image of a scattering line element 120 in an example, according to an embodiment of the principles described herein. In particular, FIG. 4 illustrates several scattering line elements 120 each having a size A and a spacing or pitch p. Light 106 scattered out of the light guide 110 by the scattering line elements 120 passes through the directional optical diffuser 130 of the privacy-mode backlight 100 as emitted light 102. The emitted light 102 passing through the directional optical diffuser 130 produces a scattering line element image 120' of the scattering line elements 120 at an output plane 100' of the privacy-mode backlight 100, as illustrated. Further, as illustrated, the diffusion angle of the directional optical diffuser 130 effectively expands an extent of the scattering line element image 120'. In some embodiments, the diffusion angle may be chosen or predetermined to expand the extent of the scattering line element images 120' sufficiently to make the scattering line elements 120 appear at the output plane 100' to be substantially continuous in the x-direction, e.g., as illustrated.

Expanding an extent of the images of the scattering line elements 120 or equivalently spreading out the emitted light 102 from each of the plurality of scattering line elements 120 using the directional optical diffuser 130 may allow the density of the scattering line elements 120 to be reduced, while still providing uniform illumination. For example, the density of the scattering line elements 120 may be reduced to less than and in some examples, much less than, one scattering line element 120 per pixel (such as an integer fraction per pixel) of a display that employs the privacy-mode backlight 100. This may reduce a complexity of the privacy-mode backlight 100, which may increase the manufacturing yield and, thus, may reduce the cost of the privacy-mode backlight 100 or a display that includes the privacy-mode backlight 100, according to some embodiments. According to some embodiments, the directional optical diffuser 130 may comprise an anisotropic light-diffusing layer or film such as, but not limited to, a holographic diffuser configured to provide anisotropic light diffusion.

In some embodiments, the scattering line element 120 may be a continuous or substantially continuous scattering structure along the length of the scattering line element 120 (i.e., continuous in a width or y-direction, as illustrated in FIGS. 3B-3C). In other embodiments, a scattering line element 120 of the scattering line element plurality may comprise an array of individual scattering elements arranged in a line along a length of the scattering line element 120 (i.e., a linear array extending in the width or the y-direction, as illustrated). In particular, adjacent individual scattering elements of the individual scattering element array may be separated from one another by a gap, in some embodiments.

Figure 5A:
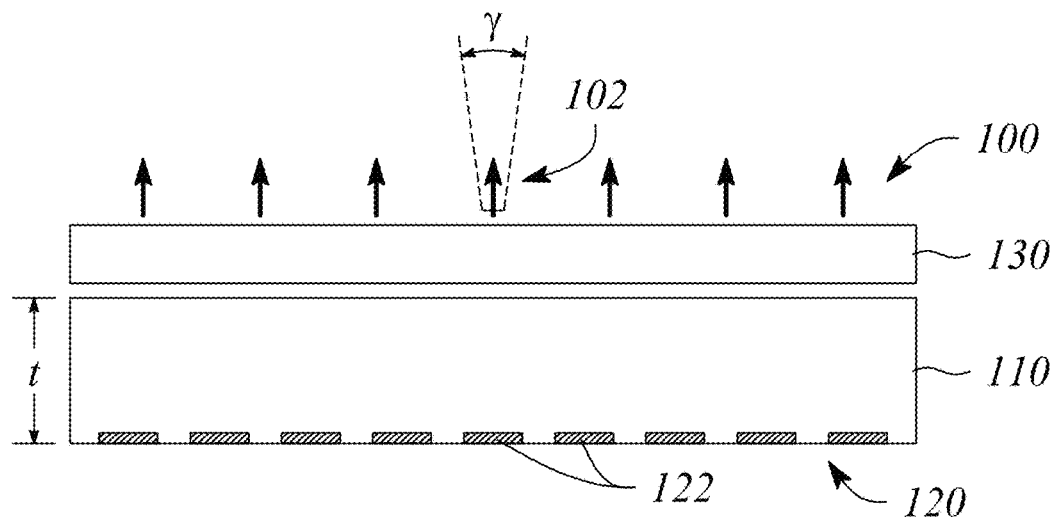
FIG. 5A illustrates cross-sectional view of a privacy-mode backlight in an example, according to another embodiment consistent with the principles described herein.
Figure 5B:
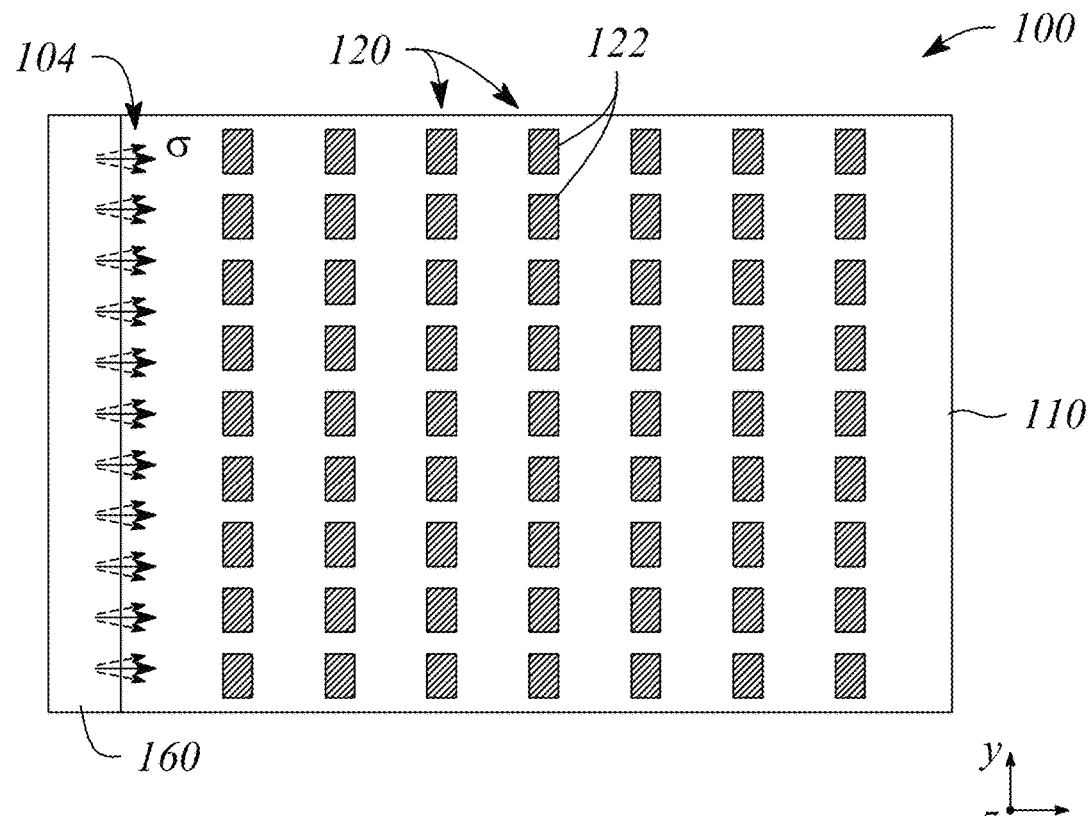
FIG. 5B illustrates a top view of a privacy-mode backlight in an example, according to another embodiment consistent with the principles described herein.

FIG. 5A illustrates cross-sectional view of a privacy-mode backlight 100 in an example, according to another embodiment consistent with the principles described herein. FIG. 5B illustrates a top view of a privacy-mode backlight 100 in an example, according to another embodiment consistent with the principles described herein. As illustrated in FIGS. 5A-5B, the privacy-mode backlight 100 is substantially similar to the privacy-mode backlight 100 illustrated in FIGS. 3A-3C. In particular, FIGS. 5A-5B illustrate the privacy-mode backlight 100 comprising the light guide 110, the scattering line elements 120, and the directional optical diffuser 130. However, in the embodiment illustrated in FIGS. 5A-5B, the scattering line elements 120 of the scattering line element plurality each comprise an array of individual scattering elements 122. Further, the array of individual scattering elements 122 is arranged as linear array along a length of the scattering line element 120 within the light guide 110 with each individual scattering element 122 being separated from adjacent individual scattering elements by a gap. In these embodiments where individual scattering elements 122 are separated by a gap from one another, the directional optical diffuser 130 may be further configured to provide directional diffusion of the emitted light 202 in the orthogonal direction corresponding to a width direction of the light guide 110.

Accordingly, the provided directional diffusion in the width direction may be configured to provide a uniform illumination pattern of the emitted light 202 in the width direction in addition to the length direction, in various embodiments. Note that a diffusion angle of the directional optical diffuser 130 in the width direction may be different from the diffusion angle in the length direction. However, the diffusion angle in the width direction may still be chosen along with a length of and a gap between the individual scattering elements 122 of the scattering line element 120 to insure viewing privacy, according to various embodiments.

As previously mentioned above, the scattering line elements 120 of the scattering line element plurality may comprise unidirectional scattering elements configured to preferentially scatter out the guided light 104 in a direction of the emission surface of the light guide 110. For example, a scattering line element 120 of the scattering line element plurality may comprise a diffraction grating. The diffraction gratings may be configured to diffractively scatter out the portion of the guided light 104 from the light guide 110 as the emitted light 102 by diffractive scattering. Notably, the diffraction gratings 120 may include diffractive features comprising one or both of grooves in the second surface 110″ and ridges on the second surface 110‴. Further, the grooves or ridges may be slanted to provide unidirectional scattering, for example.

In other embodiments, the scattering line elements 120 may include reflective islands (localized reflectors) aligned with the diffraction gratings 120 adjacent to scattering line elements 120 opposite to the emission surface (i.e., the first surface 110'). For example, a reflective island may be aligned with and have an extent or a size corresponding to an extent or a size of a diffraction grating of the scattering line element 120. More generally, the reflective island may be patterned in a manner corresponding to the scattering line element 120. The reflective islands may comprise a reflective material configured to reflectively redirect light scattered by the scattering line element 120 in an incorrect direction (i.e., away from the emission surface) into a direction corresponding to a direction of the emitted light 102. In these embodiments, the scattering line element 120 comprising a diffraction grating and the reflective island may represent a reflection mode diffraction grating. In other embodiments, such as when a reflective island is not employed, the scattering line elements 120 may comprise a transmission mode diffraction grating defined or implemented on a surface or within the light guide 110.

In some embodiments, the reflective island of the scattering line elements 120 may include a metal (e.g., gold, aluminum, silver, etc.) or a polymer-metal combination (e.g., an aluminum polymer film), or even a dielectric layer (e.g., silicon nitride or titanium oxide) configured as a reflector. Moreover, in some embodiments, the reflective islands may be separated from the scattering line element 120, e.g., by an air gap or by a gap filled with a dielectric material.

In some embodiments where the scattering line elements 120 comprise a diffraction grating, the diffraction grating may include a plurality of diffractive features spaced apart from one another by a diffractive feature spacing (which is sometimes referred to as a 'grating spacing') or a diffractive feature or grating pitch configured to provide diffractive coupling out of the guided light portion. According to various embodiments, the spacing or grating pitch of the diffractive features in the diffraction grating may be sub-wavelength (i.e., less than a wavelength of the guided light). Note that the diffraction grating may include a plurality of different grating spacings (e.g., two or more grating spacings) or a variable grating spacing or pitch to diffractively scatter out the guided light portion.

According to some embodiments, the diffractive features of the diffraction grating may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110. Note that grating characteristics (such as grating pitch, groove depth, ridge height, etc.) and/or a density of diffraction gratings along the x-direction may be used to compensate for a change in optical intensity of the guided light 104 within the light guide 110 as a function of propagation distance, according to some embodiments.

In some embodiments, the diffraction grating of the scattering line element 120 may be a uniform diffraction grating in which the diffractive feature spacing is substantially constant or unvarying throughout the diffraction grating. In other embodiments, the diffraction grating may comprise a variable or chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed. Note that, in some embodiments described herein, the emitted light 102 may include an effect of refraction due to the portion of the guided light 104 exiting the light guide 110 at the first surface 110'.

While the preceding discussion described the plurality of scattering line elements 120 as or comprising diffraction gratings 120, in other embodiments a wide variety of optical components may be used as scattering line elements 120 to scatter out the emitted light 102. For example, the scattering line elements 120 may comprise micro-reflective elements that are configured to reflectively scatter out the portion of the guided light 104. In another example, the scattering line elements 120 may comprise micro-refractive elements that are configured to refractively scatter out the portion of the guided light 104 as the emitted light 102. For example, the micro-reflective elements may include a triangular-shaped mirror, a trapezoid-shaped mirror, a pyramid-shaped mirror, a rectangular-shaped mirror, a hemispherical-shaped mirror, a concave mirror and/or a convex mirror. Note that these micro-reflective and micro-refractive elements may be located on the second surface 110", on the first surface 110', or between the first surface 110' and the second surface 110" of the light guide 110, according to various embodiments. Furthermore, an optical feature of the scattering line element 120 may be a 'positive feature' that protrudes out a surface, or it may be a 'negative feature' that is recessed into a surface.

Figure 6A:
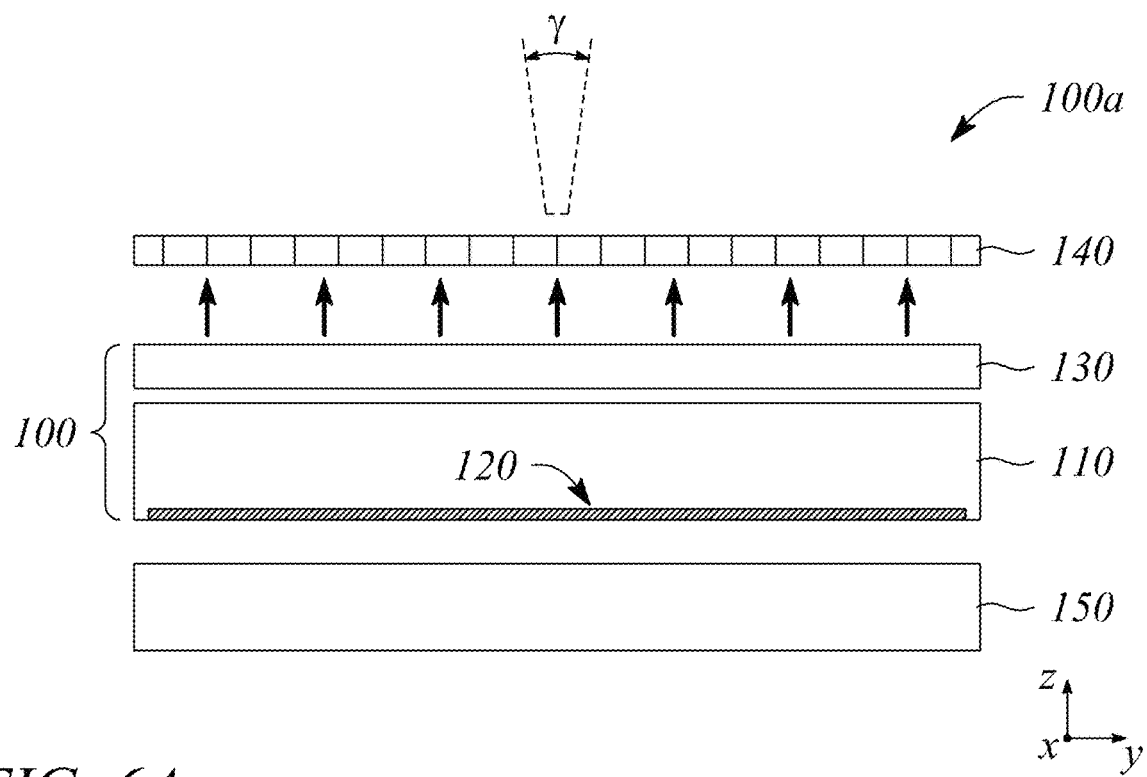
FIG. 6A illustrates a cross-sectional view of a mode-switchable display including a privacy-mode backlight in an example, according to an embodiment consistent with the principles described herein.
Figure 6B:
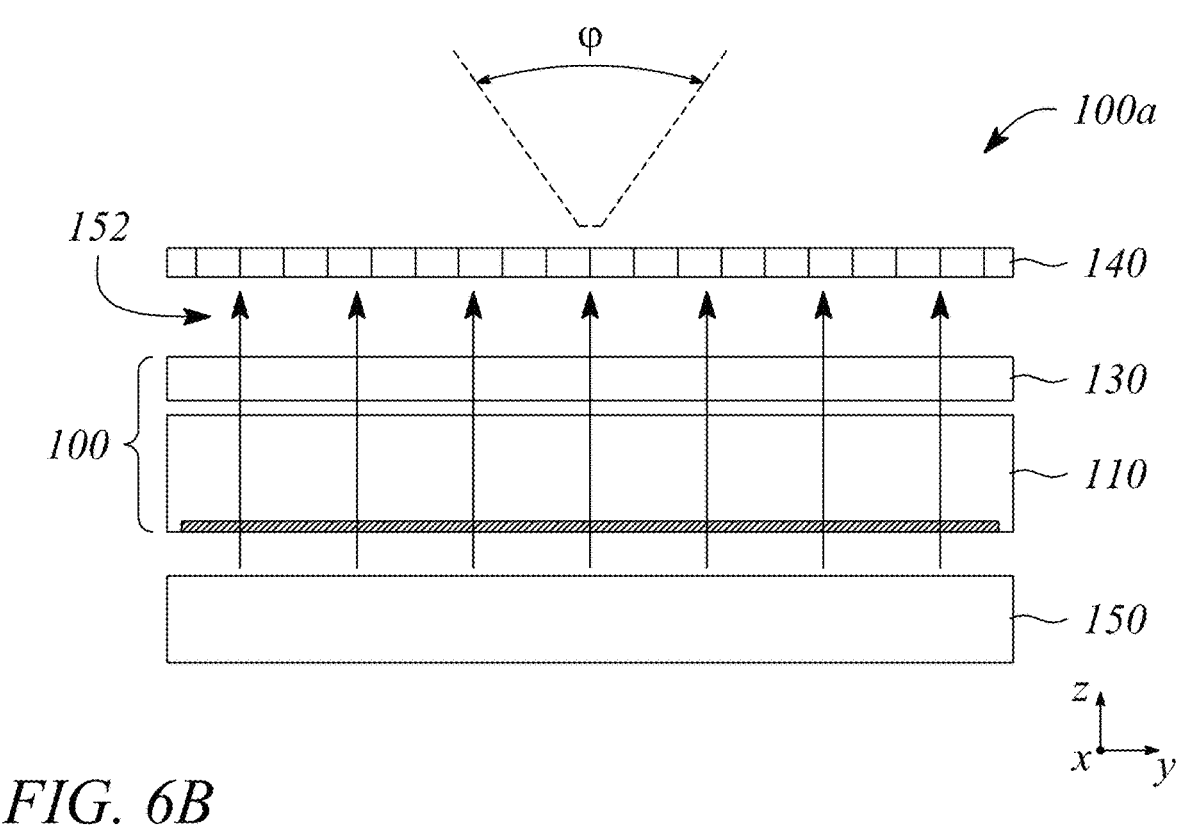
FIG. 6B illustrates a cross-sectional view of a mode-switchable display including a privacy-mode backlight in another example, according to an embodiment consistent with the principles described herein.

According to some embodiments, the privacy-mode backlight 100 may be used as a backlight in a mode-switchable display 100a. FIG. 6A illustrates a cross-sectional view of a mode-switchable display 100a including a privacy-mode backlight 100 in an example, according to an embodiment consistent with the principles described herein. FIG. 6B illustrates a cross-sectional view of a mode-switchable display 100a including a privacy-mode backlight 100 in another example, according to an embodiment consistent with the principles described herein. In particular, FIG. 6A illustrates the mode-switchable display 100a in or during a privacy mode, while FIG. 6B illustrates the mode-switchable display 100a in or during a broad-angle or shared mode. According to various embodiments, the mode-switchable display 100a is configured to selectively display a private image during the privacy mode and a shared image during the shared mode.

As illustrated, the mode-switchable display 100a comprises the privacy-mode backlight 100 configured to provide emitted light 102 that, in turn, may be modulated to provide images having a narrow illumination beamwidth or equivalently a narrow viewing angle in or during the privacy mode of the mode-switchable display 100a. In particular, in the privacy mode, the provided guided light in the light guide 110 of the privacy-mode backlight 100 may be scattered out and directed away from mode-switchable display 100a by the scattering line elements 120. The emitted light 102 from scattering line elements 120 may then be modulated using an array of light valves 140 (described below) of the mode-switchable display 100a, to facilitate the display of the private image having the narrow illumination beamwidth or narrow viewing angle (e.g., γ). The private image may be visible only within the narrower illumination beamwidth or narrow viewing angle and therefore may allow a user of the mode-switchable display 100a to more securely view the private image, according to various embodiments.

Alternatively, in the shared mode, the mode-switchable display 100a may dynamically switch (e.g., may be switched on demand) to providing the shared image having a wide or broad-angle illumination beamwidth or equivalently a broad-angle viewing angle (e.g., φ). In particular, the broad-angle illumination beamwidth during the shared mode is greater than, and in some embodiments substantially greater than, the narrow illumination beamwidth of the privacy mode. For example, the broad-angle illumination beamwidth of the shared mode may be greater than about twenty degrees (e.g., >±20°), while the narrow illumination beamwidth of the privacy mode may be less than about twenty degrees (e.g., <±20°), for example. In another example, the broad-angle illumination beamwidth of the shared mode may be greater than about sixty degrees (e.g., >±60°), or greater than about forty degrees (e.g., >±40°), or greater than about 30 degrees (e.g., >±30°), while the narrow illumination beamwidth of the privacy mode may be less than about thirty degrees (e.g., <±30°), or less than about twenty degrees (e.g., <±20°), or less than about ten degrees (e.g., <±10°), respectively. In some embodiments, the narrow illumination beamwidth or viewing angle may be less than about one half (½) of the broad-angle illumination beamwidth, or less than about one quarter (¼) of the broad-angle illumination beamwidth, or even less.

To provide the broad-angle illumination beamwidth or viewing angle, the mode-switchable display 100a further comprises a broad-angle backlight 150, as illustrated in Figured 6A-6B. According to various embodiments, the broad-angle backlight 150 is configured to provide broad-angle light 152 during the shared mode, i.e., emitted light having an illumination beamwidth that corresponds to the broad-angle illumination beamwidth or viewing angle of the mode-switchable display 100a during the shared mode. As illustrated, the broad-angle backlight 150 may be adjacent to a side (i.e., the second surface 110") of the privacy-mode backlight 100 opposite to a side adjacent to the light valve array. According to various embodiments, the light guide 110 and the scattering line elements 120 may be configured to be transparent to the broad-angle light 152 provided by the broad-angle backlight 150 during the shared mode. According to various embodiments, the broad-angle backlight 150 may comprise substantially any planar light source configured to provide broad-angle illumination including a backlight that includes a light guide and broad-angle scattering element. Further, the shared image may have substantially the same brightness and resolution as the private image, in some embodiments.

As illustrated in FIGS. 6A-6B, the mode-switchable display 100a further comprises the array of light valves 140. The array of light valves 140 is configured to modulate light to provide an image that is displayed by the mode-switchable display 100a. In particular, the light valve array configured to modulate the broad-angle light 152 to provide the shared image during the share mode of the mode-switchable display 100a, as illustrated. Further, as noted above, the array of light valves 140 is configured to modulate the emitted light 102 provided by the privacy-mode backlight 100 as a private image during the privacy mode of the mode-switchable display 100a. In various embodiments, any of a variety of different types of light valves may be employed as the light valves 140 of the light valve array including, but not limited to, one or more of liquid crystal light valves, electrophoretic light valves, and light valves based on electrowetting.

According to some embodiments, a size of the scattering line element 120 in the length or x-direction of the light guide 110 is comparable to a size of a light valve 140. Herein, the 'size' may be defined in any of a variety of manners to include, but not be limited to, a length, a width or an area. For example, the size of a light valve 140 may be a length thereof and the comparable size of the scattering line element 120 may also be a length of the scattering line element 120. In another example, the size may refer to an area such that an area of the scattering line element 120 may be comparable to an area of the light valve 140.

In some embodiments, a size of the scattering line element 120 is comparable to the light valve size such that the diffraction grating size is between about fifty percent (50%) and about two hundred percent (200%) of the light valve size. In other examples, the scattering line element size is in a range that is greater than about sixty percent (60%) of the light valve size, or greater than about seventy percent (70%) of the light valve size, or greater than about eighty percent (80%) of the light valve size, or greater than about ninety percent (90%) of the light valve size, and that is less than about one hundred eighty percent (180%) of the light valve size, or less than about one hundred sixty percent (160%) of the light valve size, or less than about one hundred forty percent (140%) of the light valve size, or less than about one hundred twenty percent (120%) of the light valve size. For example, by 'comparable size', the scattering line element size may be between about seventy-five percent (75%) and about one hundred fifty (150%) of the light valve size. In another example, the scattering line element may be comparable in size to the light valve size, where the scattering line element size is between about one hundred twenty-five percent (125%) and about eighty-five percent (85%) of the light valve size. According to some embodiments, the comparable sizes of the scattering line element 120 and the light valve 140 may be chosen to reduce, or in some examples to minimize, dark zones between scattering line elements 120 of the mode-switchable display 100a. Moreover, the comparable sizes of the scattering line element 120 and the light valve 140 may be chosen to reduce, and in some examples to minimize, Moire associated with the mode-switchable display 100a, e.g., the scattering line element size may be about equal to the light valve size.

Referring again to FIGS. 3A and 3C, the privacy-mode backlight 100 may further comprise a light source 160. According to various embodiments, the light source 160 is configured to provide the light to be guided within light guide 110. In particular, the light source 160 may be located adjacent to an entrance surface or end (input end) of the light guide 110. In various embodiments, the light source 160 may comprise substantially any source of light (e.g., optical emitter) including, but not limited to, an LED, a laser (e.g., laser diode) or a combination thereof. In some embodiments, the light source 160 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 160 may be a substantially broadband light source configured to provide substantially broadband or polychromatic light. For example, the light source 160 may provide white light. In some embodiments, the light source 160 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 160 may further comprise a collimator. The collimator may be configured to receive substantially uncollimated light from one or more of the optical emitters of the light source 160. The collimator is further configured to convert the substantially uncollimated light into collimated light. In particular, the collimator may provide collimated light that is collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 110 to propagate as the guided light 104, described above.

Figure 7:
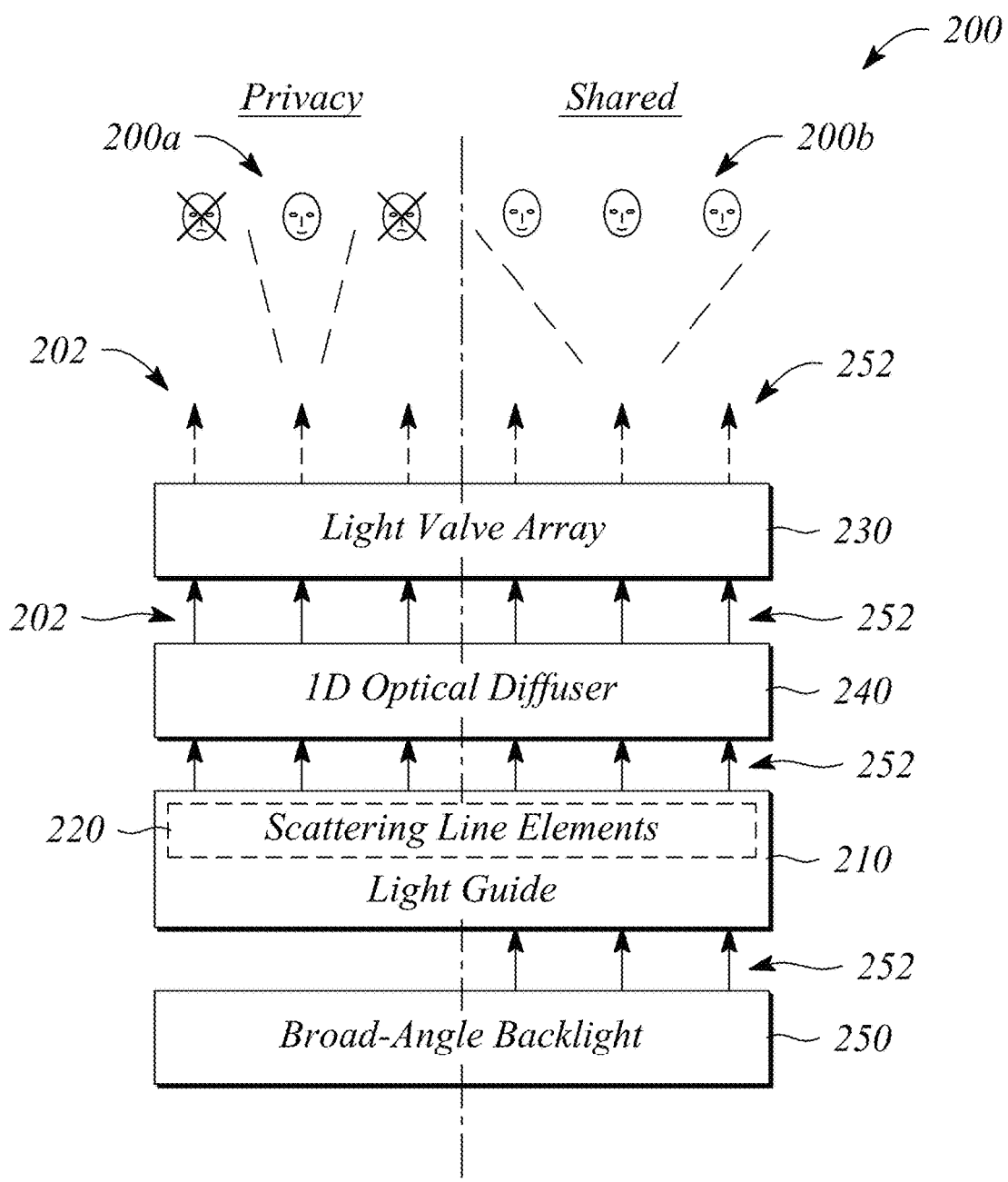
FIG. 7 illustrates a block diagram of a privacy display in an example, according to an embodiment consistent with the principles described herein.

In accordance with some embodiments of the principles described herein, a privacy display is provided. FIG. 7 illustrates a block diagram of a privacy display 200 in an example, according to an embodiment consistent with the principles described herein. According to various embodiments, the privacy display 200 is configured to display a private image having a narrow view angle. In particular, modulated emitted light 202 from the privacy display 200 provides the private image in a restricted angular range (i.e., narrow view angle) that may be viewable by a user 200*a*, but not by others, e.g., that are outside the restricted angular range or private view zone. The modulated emitted light 202 is illustrated as dashed arrows emanating from the privacy display 200 in FIG. 7 to emphasize the modulation thereof by way of example and not limitation.

As illustrated, the privacy display 200 comprises a plurality of scattering line elements 220 distributed along a length of a light guide 210. The scattering line element plurality is configured to scatter out guided light from the light guide 210 as emitted light having a predetermined illumination beamwidth in a direction orthogonal to the light guide length. In some embodiments, the light guide 210 may be substantially similar to the light guide 110, described above with respect to the privacy-mode backlight 100. For example, the light guide may be configured to guide light as a guided light beam, according to total internal reflection, in various embodiments. Further, the light guide 210 may be a plate light guide configured to guide light from a light-input edge thereof. Further, the plurality of scattering line elements 220 may be substantially similar to the scattering line elements 120 of the above-described privacy-mode backlight 100.

In particular, the guided light may be collimated according to a collimation factor. Further, the predetermined illumination beamwidth may be determined by the collimation factor of the guided light, in some embodiments. More particularly, the collimation factor of the guided light may be specifically selected to achieve the predetermined illumination beamwidth. In some embodiments, scattering line elements 220 of the scattering line element plurality may comprise scattering elements configured to preferentially scatter out the guided light in a direction of an emission surface of the light guide 210. As such, the scattering line elements may be unidirectional scattering line elements. For example the scattering line elements may include a reflector or a reflective island, as described above.

In various embodiments, scattering line elements 220 may comprise a diffraction grating or a plurality of diffraction gratings configured to provide the emitted light 202. In particular, the diffraction grating may be configured to diffractively scatter out a portion of the guided light from the light guide 210 as the emitted light 202. In some embodiments, the diffraction grating may be substantially similar to the diffraction grating of the scattering line element 120, described above. In other embodiments, the scattering line elements 220 may comprise other scattering elements including, but not limited to micro-reflective elements and micro-refractive elements, as described above with respect to the scattering line element 120 of the privacy-mode backlight 100.

The privacy display 200 illustrated in FIG. 7 further comprises an array of light valves 230. The array of light valves 230 is configured to modulate the emitted light 202 to provide the private image. In some embodiments, the array of light valves 230 may be substantially similar to the array of light valves 140, as described above with respect to the privacy-mode backlight 100.

According to some embodiments, a size of a scattering line element 220 of the scattering line element plurality in a length direction along the light guide 210 is comparable to a size of a light valve of the array of light valves 230. For example, the size of the scattering line element may be greater than one half of the light valve size and less than twice the light valve size, in some embodiments.

According to various embodiments, the privacy display 200 further comprises a directional optical diffuser 240, as illustrated in FIG. 7. The directional optical diffuser is located between the light guide 210 and the array of light valves 230, as illustrated in FIG. 7. In various embodiments, the directional optical diffuser is configured to provide directional diffusion of the emitted light 202 in a direction corresponding to the light guide length. In some embodiments, the directional optical diffuser 240 may be substantially similar to the directional optical diffuser 130 of the above-described privacy-mode backlight 100. In particular, the directional diffusion of the directional optical diffuser 240 may provide uniform illumination of the light valve array in the light guide length direction, according to various embodiments.

In some of these embodiments (not illustrated in FIG. 7), the privacy display 200 may further comprise a light source. The light source may be configured to provide the light to the light guide 210 collimated according to a collimation factor to provide a predetermined angular spread of the guided light within the light guide 210, for example. According to some embodiments, the light source may be substantially similar to the light source 160, described above.

In some embodiments (e.g., as illustrated in FIG. 7), the privacy display 200 may further comprise a broad-angle backlight 250 located adjacent to a side of the light guide 210 opposite to a side adjacent to the light valve array. In some embodiments, the broad-angle backlight 250 may be substantially similar to the broad-angle backlight 150 of the above-described mode-selectable display 100*a* and the privacy display 200 may be or operate as a mode-selectable display. In particular, the broad-angle backlight 250 may be configured to provide broad-angle light 252 during a shared mode of the privacy display 200. Further, the light valve array may be configured to modulate the broad-angle light 252 to provide a shared image during the shared mode. According to various embodiments, the shared image may be viewed by a plurality of users 200*b* in various different locations within a shared view zone having a broad-angle or relatively unrestricted angular range, as illustrated in FIG. 7 by way of example and not limitation. When operated as a mode-selectable display, the light guide 210 and scattering line elements 220 of the privacy display 200 may be configured to be transparent to the broad-angle light 252. In addition, the privacy display 200 may be mode-switchable between the shared mode to provide the shared image and a privacy mode to provide the private image, according to some embodiments.

Figure 8:
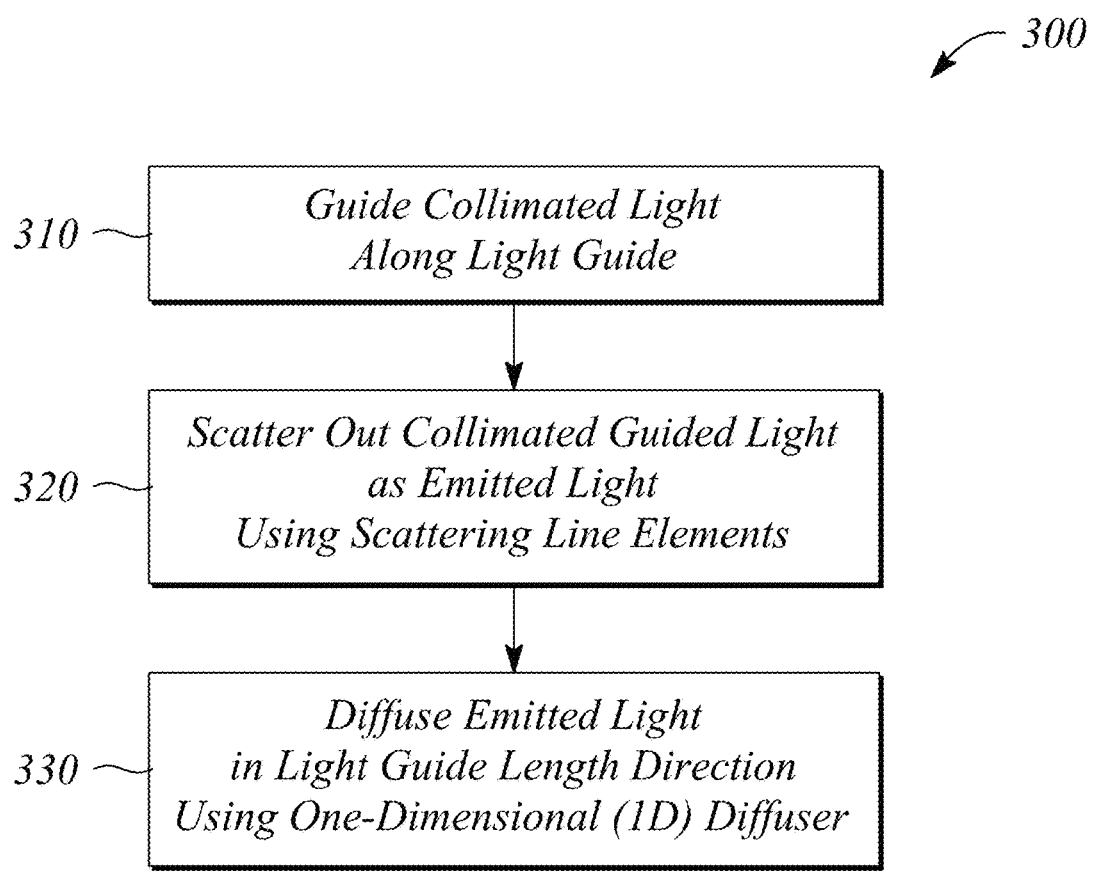
FIG. 8 illustrates a flow chart of a method of privacy-mode backlight operation in an example, according to an embodiment consistent with the principles described herein.

In accordance with other embodiments of the principles described herein, a method of privacy-mode backlight operation is provided. FIG. 8 illustrates a flow chart of a method 300 of privacy-mode backlight operation in an example, according to an embodiment consistent with the principles described herein. As illustrated in FIG. 8, the method 300 of privacy-mode backlight operation comprises guiding 310 the light in a light guide as collimated guided light having a predetermined collimation factor. According to some embodiments, the light guide may be substantially similar to the light guide 110 described above with respect to the privacy-mode backlight 100. In particular, the light may be guided according to total internal reflection within the light guide, according to various embodiments.

According to various embodiments, the method 300 of privacy-mode backlight operation further comprises scattering out 320 a portion of the collimated guided light from the light guide as emitted light having an illumination beamwidth. Scattering out the collimated guided light portion uses a plurality of scattering line elements spaced apart from one another along a length of the light guide, in various embodiments. In some embodiments, the light guide and scattering line elements may be substantially similar respectively to the light guide 110 and scattering line elements 120, described above with respect to the privacy-mode backlight 100. In some embodiments, the scattering line elements of the scattering line element plurality may comprise unidirectional scattering elements that preferentially scatter out the collimated guided light in a direction of emitted light from the light guide. Further, according to various embodiments, the illumination beamwidth of the emitted light scattered out by the scattering line element plurality is determined by the collimation factor, the illumination beamwidth being in a direction orthogonal to the light guide length.

The method 300 of privacy-mode backlight operation illustrated in FIG. 8 further comprises diffusing 330 the emitted light in a direction corresponding to the light guide length using a directional optical diffuser. In some embodiments, the directional optical diffuser may be substantially similar to the directional optical diffuser 130 of the privacy-mode backlight 100, as described above. In some embodiments, a diffusion angle of the directional optical diffuser spreads out the emitted light from scattering line elements of the scattering line element plurality to provide an illumination extent equivalent to a distance between adjacent scattering line elements of the scattering line element plurality. In some embodiments, a size of a scattering line element of the scattering line element plurality may be comparable to a size of a light valve of a light valve array used to modulate the emitted light as a private image displayed by a privacy display.

In some embodiments (not illustrated), the method 300 of privacy-mode backlight operation further comprises modulating the emitted light to display a private image using an array of light valves. The plurality of light valves may be substantially similar to the array of light valves 140 described above with respect to the privacy-mode backlight 100.

In some embodiments (not illustrated), the method 300 of privacy-mode backlight operation may further comprise providing light to the light guide using a light source. The provided light may be collimated according to a predetermined collimation factor. According to some embodiments, the light source may be substantially similar to the light source 160, described above.

Thus, there have been described examples and embodiments of a privacy-mode backlight, a privacy display, and a method of privacy-mode backlight operation that employ line scattering elements and a directional diffuser. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A privacy-mode backlight, comprising:
a light guide configured to guide light along a length of the light guide as guided light having a predetermined collimation factor in a direction orthogonal to the light guide length;
a plurality of scattering line elements arranged parallel to and spaced apart from one another along the light guide length, each scattering line element of the scattering line element plurality being configured to scatter out through an emission surface of the light guide a portion of the guided light as emitted light having an illumination beamwidth in the orthogonal direction determined by the predetermined collimation factor; and
a directional optical diffuser configured to provide directional diffusion of the emitted light in a direction corresponding to the light guide length,
wherein scattering line elements of the scattering line element plurality are located at a surface of the light guide opposite to the emission surface, a diffusion angle of the directional optical diffuser in the direction corresponding to the light guide length being proportional to a distance between adjacent scattering line elements multiplied by a refractive index of the light guide and divided by a thickness of the light guide.

2. The privacy-mode backlight of claim 1, wherein the directional diffusion of the emitted light provided by the directional optical diffuser is configured to provide a uniform illumination pattern of the emitted light in the direction corresponding to the light guide length.

3. The privacy-mode backlight of claim 2, wherein a diffusion angle of the directional optical diffuser is configured to spread out the emitted light from each of the scattering line elements to have an illumination extent at an output plane of the privacy-mode backlight that is equivalent to a distance between adjacent scattering line elements of the light scattering line element plurality.

4. The privacy-mode backlight of claim 1, wherein scattering line elements of the scattering line element plurality comprise unidirectional scattering elements configured to preferentially scatter out the guided light in a direction of the emission surface.

5. The privacy-mode backlight light of claim 1, wherein a scattering line element of the scattering line element plurality comprises a diffraction grating located at a surface of the light guide, the diffraction grating having diffractive features comprising one or both of grooves in the light guide surface and ridges on the light guide surface.

6. The privacy-mode backlight of claim 5, wherein the diffraction grating further comprises a reflective island aligned with the diffraction grating adjacent to the diffractive features and opposite to the emission surface, the diffraction grating and the reflective island, in combination, representing a reflection mode diffraction grating.

7. The privacy-mode backlight of claim 1, wherein a scattering line element of the scattering line element plurality comprises an array of individual scattering elements arranged in a line along a length of the scattering line element.

8. The privacy-mode backlight of claim 7, wherein adjacent individual scattering elements of the individual scattering element array are separated from one another by a gap, and wherein the directional optical diffuser is further configured to provide directional diffusion of the emitted light in the orthogonal direction corresponding to a width direction of the light guide, the provided directional diffusion in the width direction being configured to provide a uniform illumination pattern of the emitted light in the width direction.

9. The privacy-mode backlight of claim 1, further comprising a light source optically coupled to the light guide and configured to provide light to the light guide to be guided as the guided light having the predetermined collimation factor.

10. A mode-switchable display comprising the privacy-mode backlight of claim 1, the mode-switchable display further comprising an array of light valves configured to modulate the emitted light provided by the privacy-mode backlight as a private image during a privacy mode of the mode-switchable display, the private image being selectably visible within the illumination beamwidth of the privacy-mode backlight during the privacy mode.

11. The mode-switchable display of claim 10, wherein a size of a scattering line element of the scattering line element plurality is comparable to a size of a light valve of the light valve array.

12. The mode-switchable display of claim 10, further comprising a broad-angle backlight adjacent to a side of the light guide opposite to a side adjacent to the light valve array, the broad-angle backlight being configured to provide broad-angle light during a shared mode of the mode-switchable display, the light valve array being configured to modulate the broad-angle light as a shared image during the shared mode,
wherein the light guide and scattering line elements of the line element plurality are configured to be transparent to the broad-angle light, the mode-switchable display being configured to selectively display the private image during the privacy mode and the shared image during the shared mode.

13. A privacy display comprising:
a plurality of scattering line elements distributed along a length of a light guide, the scattering line element plurality being configured to scatter out guided light from the light guide as emitted light having a predetermined illumination beamwidth in a direction orthogonal to the light guide length;
an array of light valves configured to modulate the emitted light to provide a private image; and
a directional optical diffuser located between the light guide and the light valve array, the directional optical diffuser being configured to provide directional diffusion of the emitted light in a direction corresponding to the light guide length, the directional diffusion providing uniform illumination of the light valve array in the light guide length direction,
wherein scattering line elements of the scattering line element plurality are located at a surface of the light guide opposite to an emission surface of the light guide through which the emitted light is scattered, a diffusion angle of the directional optical diffuser in the direction corresponding to the light guide length being proportional to a distance between adjacent scattering line elements multiplied by a refractive index of the light guide and divided by a thickness of the light guide.

14. The privacy display of claim 13, wherein the guided light has is collimated according to a collimation factor, the predetermined illumination beamwidth being determined by the collimation factor of the guided light.

15. The privacy display of claim 13, wherein scattering line elements of the scattering line element plurality comprise scattering elements configured to preferentially scatter out the guided light in a direction of an emission surface of the light guide adjacent to the directional optical diffuser.

16. The privacy display of claim 13, wherein a size of a scattering line element of the scattering line element plurality is comparable to a size of a light valve of the light valve array.

17. The privacy display of claim 13, further comprising a broad-angle backlight adjacent to a side of the light guide opposite to a side adjacent to the light valve array and being configured to provide broad-angle light during a shared mode, the light valve array being configured to modulate the broad-angle light as a shared image during the shared mode,
wherein the light guide and scattering line elements of the line element plurality are configured to be transparent to the broad-angle light, the privacy display being mode-switchable between the shared mode to provide the shared image and a privacy mode to provide the private image.

18. A method of privacy-mode backlight operation, the method comprising:
guiding light in a light guide as collimated guided light having a predetermined collimation factor;
scattering out a portion of the collimated guided light from the light guide through an emission surface of the light guide as emitted light having an illumination beamwidth using a plurality of scattering line elements spaced apart from one another along a length of the light guide; and
diffusing the emitted light in a direction corresponding to the light guide length using a directional optical diffuser,
wherein the illumination beamwidth of the emitted light scattered out by the scattering line element plurality is determined by the predetermined collimation factor, the illumination beamwidth being in a width direction orthogonal to the light guide length,
wherein scattering line elements of the scattering line element plurality are located at a surface of the light guide opposite to the emission surface, a diffusion angle of the directional optical diffuser in the direction corresponding to the light guide length being proportional to a distance between adjacent scattering line elements multiplied by a refractive index of the light guide and divided by a thickness of the light guide.

19. The method of privacy-mode backlight operation of claim 18, wherein scattering line elements of the scattering line element plurality comprise unidirectional scattering elements that preferentially scatter out the collimated guided light in a direction toward the directional optical diffuser.

20. The method of privacy-mode backlight operation of claim 18, one or both of wherein a diffusion angle of the directional optical diffuser spreads out the emitted light from scattering line elements of the scattering line element plurality to provide an illumination extent equivalent to a distance between adjacent scattering line elements of the scattering line element plurality, and wherein a size of a scattering line element of the scattering line element plurality is comparable to a size of a light valve of a light valve array used to modulate the emitted light as a private image displayed by a privacy display.

* * * * *